(12) United States Patent
Wada et al.

(10) Patent No.: US 8,581,453 B2
(45) Date of Patent: Nov. 12, 2013

(54) ELECTRIC FAN

(75) Inventors: Yoshihiro Wada, Nagano (JP);
Michinori Watanabe, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 336 days.

(21) Appl. No.: 12/716,554

(22) Filed: Mar. 3, 2010

(65) Prior Publication Data

US 2010/0225182 A1 Sep. 9, 2010

(30) Foreign Application Priority Data

Mar. 4, 2009 (JP) ................................. 2009-050979

(51) Int. Cl.
*H02K 5/24* (2006.01)
*H02K 1/04* (2006.01)

(52) U.S. Cl.
CPC ........................................ *H02K 5/24* (2013.01)
USPC .................................. 310/51; 310/43; 310/90

(58) Field of Classification Search
CPC .................................... H02K 5/08; H02K 5/24
USPC ............................................... 310/43, 51, 90
See application file for complete search history.

(56) References Cited

U.S. PATENT DOCUMENTS

| 4,329,605 | A | * | 5/1982 | Angi et al. | 310/68 R |
|---|---|---|---|---|---|
| 4,647,803 | A | * | 3/1987 | von der Heide et al. | 310/51 |
| 5,663,604 | A | * | 9/1997 | Takahashi | 310/91 |
| 6,315,455 | B1 | * | 11/2001 | Tanaka et al. | 384/492 |
| 6,528,916 | B1 | | 3/2003 | Naito et al. | |
| 6,674,196 | B2 | * | 1/2004 | Ibata | 310/81 |
| 7,446,989 | B2 | * | 11/2008 | Preisinger et al. | 361/23 |
| 2002/0024264 | A1 | * | 2/2002 | Matsumoto | 310/68 R |
| 2002/0121821 | A1 | * | 9/2002 | Ritter | 310/71 |
| 2003/0057783 | A1 | * | 3/2003 | Melfi | 310/68 R |
| 2004/0056543 | A1 | * | 3/2004 | Melfi | 310/68 R |
| 2004/0108779 | A1 | | 6/2004 | Boettger et al. | |
| 2004/0136842 | A1 | | 7/2004 | Obara et al. | |
| 2006/0186746 | A1 | | 8/2006 | Nanbu et al. | |
| 2007/0063603 | A1 | * | 3/2007 | Levine et al. | 310/85 |
| 2007/0138748 | A1 | * | 6/2007 | Orlowski et al. | 277/412 |
| 2008/0042499 | A1 | | 2/2008 | Okada | |

(Continued)

FOREIGN PATENT DOCUMENTS

| CN | 1825735 | 8/2006 |
|---|---|---|
| CN | 102246397 | 11/2011 |

(Continued)

OTHER PUBLICATIONS

Japanese Office action, Issued Apr. 16, 2013, English translation (excerpts) included.

(Continued)

*Primary Examiner* — John K Kim
(74) *Attorney, Agent, or Firm* — Rankin, Hill & Clark LLP

(57) ABSTRACT

A fan casing, webs, and a motor casing are integrally formed of a resin material by injection molding to configure a fan housing. An electrically grounded electromagnetic noise guard and a bearing holder to which an outer race of a ball bearing are electrically connected by an electrically-conducting path member provided in the fan casing by means of insert molding. Thus, the ball bearing may sufficiently be prevented from suffering electric corrosion in an electric fan of which a fan housing is made of an insulating resin.

8 Claims, 24 Drawing Sheets

(56) References Cited

U.S. PATENT DOCUMENTS

| | | | |
|---|---|---|---|
| 2008/0088187 A1* | 4/2008 | Shao et al. | 310/51 |
| 2010/0225182 A1* | 9/2010 | Wada et al. | 310/43 |
| 2011/0234025 A1 | 9/2011 | Kado et al. | |

FOREIGN PATENT DOCUMENTS

| | | |
|---|---|---|
| JP | 2003-037956 | 2/2003 |
| JP | 2003-111341 | 4/2003 |
| JP | 2004-040926 | 2/2004 |
| JP | 2004-180495 | 6/2004 |
| JP | 2007-089338 | 4/2007 |
| JP | 2007-159302 | 6/2007 |
| JP | 2008-295223 | 12/2008 |

OTHER PUBLICATIONS

Chinese Office action, Issued Apr. 3, 2013, English translation (excerpts) included.

* cited by examiner

ELECTRIC FAN

TECHNICAL FIELD

The present invention relates to an electric fan typically used for cooling an electric apparatus.

BACKGROUND ART

Jpn. Pat. Appln. Publication No. 2003-111341 (JP2003-111341A) discloses a fan motor (an electric fan) comprising a fan casing, a motor casing including a bearing holder, at least one ball bearing, a plurality of webs connecting a housing and the motor casing, and an impeller rotatably fixed onto a rotary shaft of the motor. The fan casing, bearing holder, motor casing, ball bearing, and plurality of webs are each made of a metal. A plurality of rolling elements are arranged via a lubricant between outer and inner races of the ball bearing. The outer race is fitted in the bearing holder. IF such an electric fan is used for a prolonged period under an environment where electromagnetic noise is generated, electric corrosion occurs in the ball bearing, causing irregularities on the track surface of the outer or inner race opposite to the rolling elements and generating noise. In the electric fan disclosed in JP2003-111341A, a grounded electromagnetic noise guard is provided in or over a suction or discharge port of the fan casing so as to prevent the electromagnetic noise from entering into the motor.

In many of such a type of electric fans, a fan casing, a motor casing, and webs are each made of an insulating resin typically by means of injection molding. Also in this case, a grounded electromagnetic noise guard is provided in or over the suction or discharge port of the fan casing so as to prevent occurrence of the electric corrosion. In such a type of electric fans, however, it is difficult to sufficiently prevent occurrence of the electric corrosion in the ball bearing although the electromagnetic noise guard is provided.

SUMMARY OF INVENTION

An object of the present invention is to provide an electric fan capable of sufficiently preventing occurrence of electric corrosion of a ball bearing in a fan motor of which a fan housing is made of an insulating resin.

An electric fan according to the present invention comprises: a motor including a stator; a rotary shaft made of a metal; a fan casing made of an insulating resin and including an air channel having a suction port and a discharge port; a bearing holder made of a metal; a motor casing which is provided with the bearing holder and the stator of the motor is fixed to; at least one ball bearing made of a metal and including an inner race fitted with the rotary shaft of the motor, an outer race fitted in the bearing holder, and a plurality of rolling elements disposed between the inner and outer races via a lubricant; a plurality of webs connecting the fan casing and the motor casing; an impeller fixed on the rotary shaft to rotate in the air channel; and an electromagnetic noise guard made of a metal and disposed in or over the suction port or the discharge port of the fan casing. The electromagnetic noise guard is electrically connected to the bearing holder and electrically grounded. The term "grounded electromagnetic noise guard" means that an electromagnetic noise guard should be grounded, but a grounding means may not be provided directly in the electromagnetic noise guard. For example, an electrically conducting path eclectically connected to the electromagnetic noise guard may be used for the grounding. The term "electromagnetic noise guard" refers to a member for preventing electromagnetic noise from entering the electric fan.

The inventors of the present invention have found that a potential difference may be produced between the outer and inner races of the ball bearing by electromagnetic noise that cannot be absorbed by the electromagnetic noise guard provided in the electric fan of which the fan casing is made of an insulating resin, thereby causing electric corrosion to occur in the ball bearing. In the present invention, the outer race of the ball bearing may be grounded by electrically connecting the grounded electromagnetic noise guard and bearing holder in which the outer race of the ball bearing is fitted. As a result, the potential difference between the outer and inner races of the ball bearing may be reduced, thereby preventing electric corrosion from occurring in the ball bearing.

In general, the fan casing, webs, and motor casing are integrally formed of an insulating resin by means of injection molding to configure a fan housing. In this case, the electromagnetic noise guard and bearing holder are electrically connected by an electrically connecting means including an electrically-conducting path member that is provided in the fan housing by means of insert molding and connected to the bearing holder and electromagnetic noise guard so as to be capable of electrical conduction or in an electrically conductive manner. With this configuration, the electrically connecting means may easily be provided in the fan housing by means of insert molding. Further, since the electrically connecting means may be buried in the fan housing, the need to perform arrangement work of the electrically connecting means may be eliminated.

In some cases, the bearing holder is made of a non-conductive material or an adhesive layer is interposed between the bearing holder and bearing. An electric fan thus configured includes a fan housing made of an insulating resin and including an air channel having a suction port and a discharge port, a bearing holder fixed to the fan housing, a motor including a rotary shaft made of a metal and supported by at least one ball bearing that is made of a metal and is held by the bearing holder, an impeller fixed on the rotary shaft to rotate in the air channel, and an electromagnetic noise guard made of a metal and disposed in or over the suction port or discharge port of the air channel. In this configuration, the electromagnetic noise guard is electrically connected to an outer race of the at least one ball bearing and electrically grounded.

The present invention may be applied both to an axial flow fan motor that generates the flow of air in an axial direction of a rotary shaft and a sirocco fan motor that generates the flow of air in a direction perpendicular to the axial direction of a rotary shaft.

The electromagnetic noise guard and outer race of the at least one ball bearing may be electrically connected by an electrically connecting means including an electrically-conducting path member that is disposed along an outer surface of the fan housing and connected to the bearing holder and the electromagnetic noise guard so as to be capable of electrical conduction or in an electrically conductive manner.

Various types of electromagnetic noise guards may be adopted. For example, the electromagnetic noise guard may include at least one closed loop conductor made of a metal and opposed to the suction port or discharge port and a conductor holding means for holding the closed loop conductor. By adopting such an electromagnetic noise guard, electromagnetic noise reaching the bearing may be reduced with substantially no influence on an air suction/discharge function of the fan. Further, the electromagnetic noise guard may be used as a finger guard for preventing the user's fingers from entering the motor.

DESCRIPTION OF EMBODIMENTS

Figure 1:
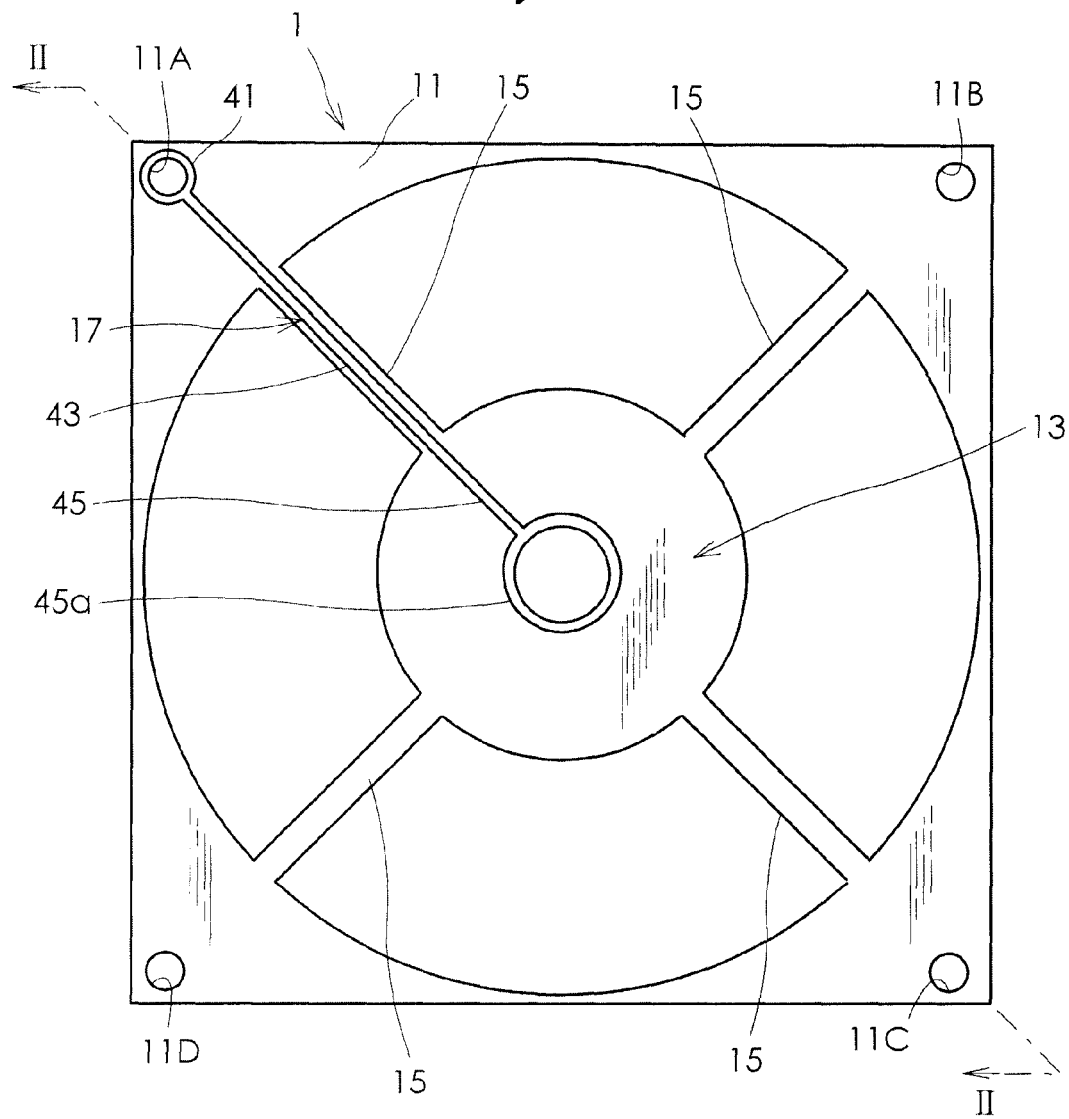
FIG. 1 is a plan view schematically showing an electric fan of an embodiment of the present invention which is applied to a fan motor.
Figure 2:
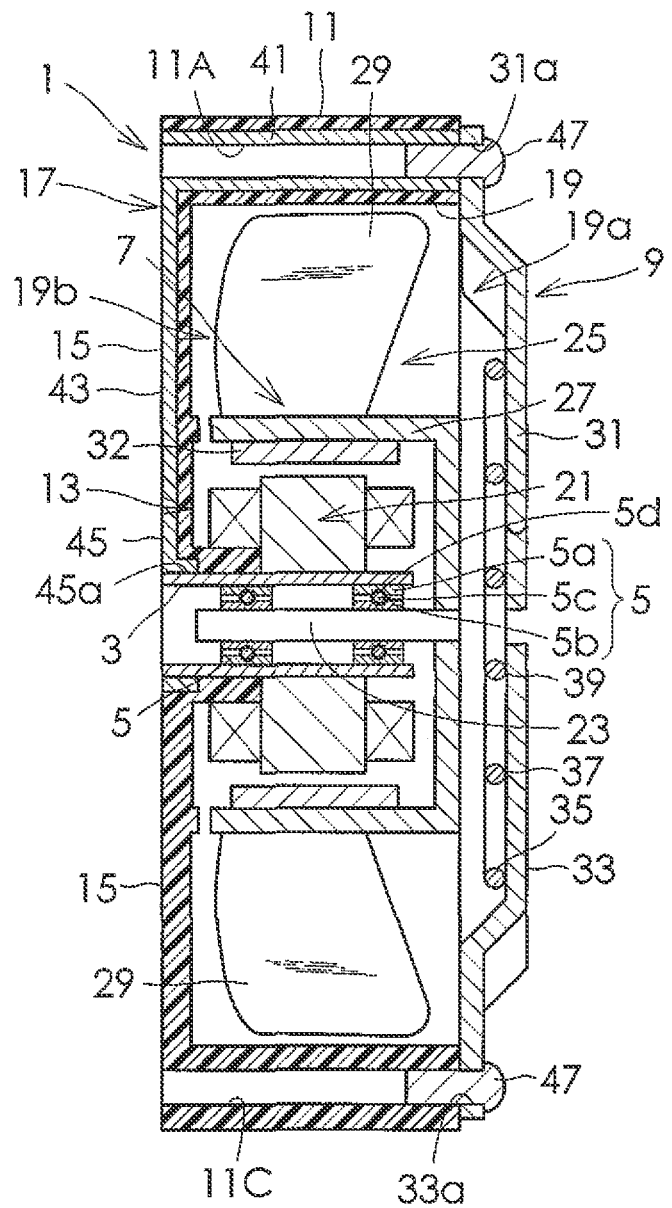
FIG. 2 is a cross-sectional view schematically showing a cross-section of FIG. 1 taken along line II-II.

Embodiments of the present invention will be described in detail below with reference to the accompanying drawings. FIG. 1 is a plan view schematically showing an electric fan of an embodiment of the present invention which is applied to a fan motor. FIG. 2 is a cross-sectional view schematically showing a cross-section of FIG. 1 taken along line II-II. As shown in FIGS. 1 and 2, an electric fan according to the present embodiment comprises a fan housing 1, a bearing holder 3, two ball bearings 5, a rotating body 7, and an electromagnetic noise guard 9. The fan housing 1 includes a fan casing 11, a motor casing 13, and four webs 15 which are integrally formed of an insulating resin by means of injection molding. An electrically-conducting path member 17 is provided in the fan housing 1 by means of insert molding. A configuration of the electrically-conducting path member 17 will be described in detail later. The fan casing 11 includes an air channel 19 having a suction port 19a and a discharge port 19b. Through holes 11A to 11D are formed in four corners of the fan casing 11. The motor casing 13 is disposed in the middle of the air channel 19. A motor stator 21 is fixed to the motor casing 13. The four webs 15 radially extend from the center of the motor casing 13, connecting the fan casing 11 and motor casing 13.

The bearing holder 3 is made of a metal and is cylindrical in shape, and is fixed to the motor casing 13 and stator 21. Two ball bearings 5, which are made of a metal, are fixed inside the bearing holder 3. A plurality of rolling elements 5c are disposed via a lubricant 5d between an outer race 5a and inner race 5b of the ball bearing 5. The outer race 5a is fitted in the bearing holder 3, and inner race 5b is fitted with a motor rotary shaft 23 to be described later. Thus, the rotary shaft 23 is rotatably supported by the motor casing 13.

The rotating body 7 includes an impeller 25 and the rotary shaft 23 made of a metal. The impeller 25 includes a cup-like member 27 to the center of which the rotary shaft 23 is fixed and a plurality of blades 29 attached to an outer periphery of the cup-like member 27. A plurality of permanent magnets 32 are attached to an inner periphery of the cup-like member so as to face the stator 21. The impeller 25 thus configured rotates in the air channel 19, causing the air to flow from the suction port 19a to discharge port 19b.

Figure 3:
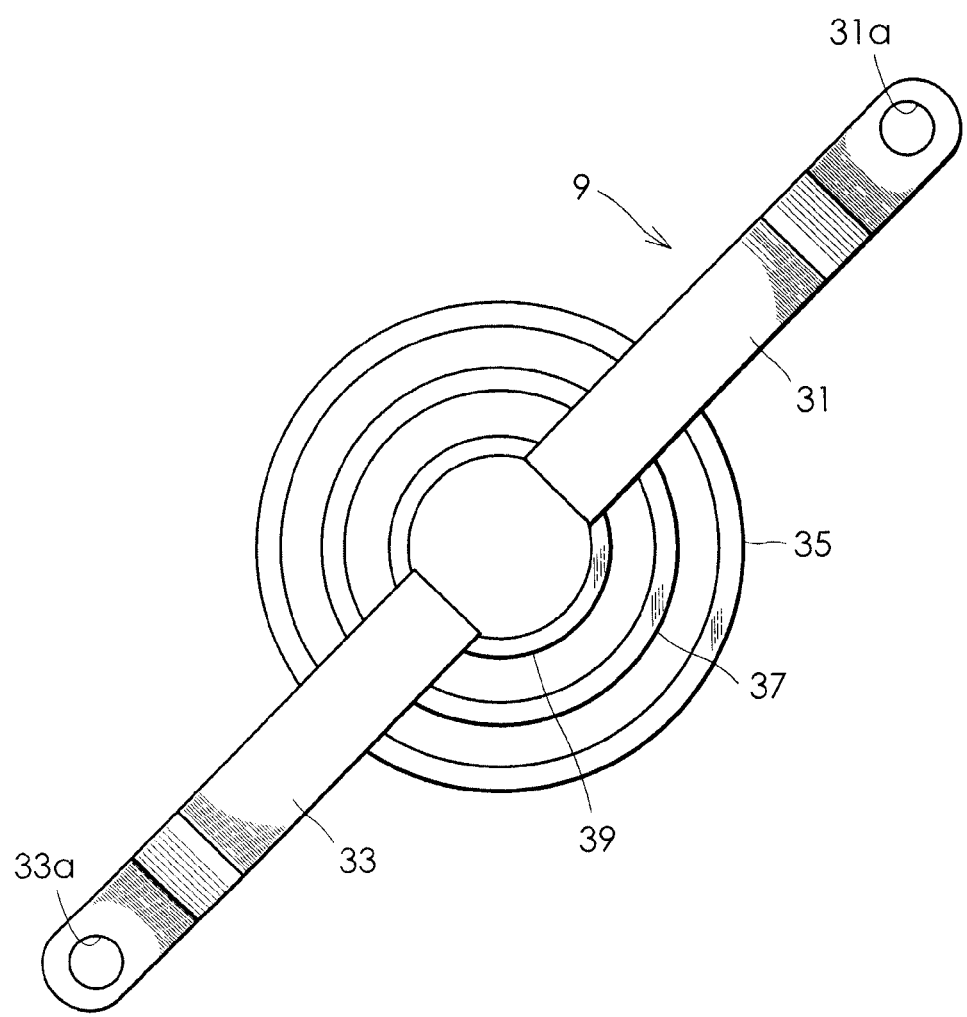
FIG. 3 is a plan view of an electromagnetic noise guard used in the electric fan of FIG. 1.

The electromagnetic noise guard 9 provided in or over the fan casing 11 is made of a metal and is constituted by, as shown in FIGS. 2 and 3, a conductor holding means including two metal supporting plates 31, and three closed loop conductors 35, 37, 39 fixed by welding to and retained by the two metal supporting plates 31, 33. The three closed loop conductors 35, 37, 39 are opposed to an end surface of the motor in an axial direction of the motor with a predetermined interval. The two metal supporting plates 31, 33 are arranged substantially in a straight line and have through holes 31a, 33a formed at one of the ends thereof, respectively. The two metal supporting plates 31, 33 are fixed to a side of the suction port 19a of the fan casing 11 by screws 47 inserted through the through holes 31a, 33a thereof and into two opposing through holes 11A, 11C in two of four corners of the fan casing 11.

The three closed loop conductors 35, 37, 39 are concentrically arranged and fixed to the back surfaces of the two metal supporting plates 31, 33 by welding.

Figure 4:
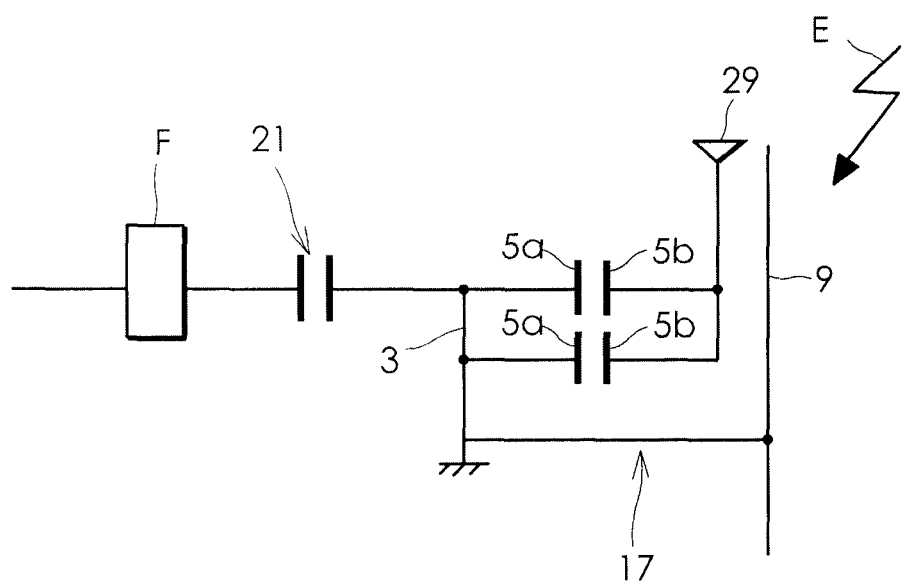
FIG. 4 is an equivalent circuit diagram of the electric fan of FIG. 1.

As described above, the electrically-conducting path member 17 is provided in the fan housing 1 by means of insert molding. As shown in a circuit diagram of FIG. 4, the electrically-conducting path member 17 constitutes an electrically connecting means for connecting the electromagnetic noise guard 9 and the bearing holder 3 in an electrically conductive manner. In the circuit diagram of FIG. 4, E denotes electromagnetic noise and F denotes a power supply filter. The electrically-conducting path member 17 is constituted by metal material, including a part 41 disposed inside the fan casing 11, a part 43 disposed inside one web 15 of the four webs 15, and a part 45 disposed inside the motor casing 13. The part 41 inside fan casing has a cylindrical shape having formed therein the through hole 11A through which the screw 47 for fixing the electromagnetic noise guard 9 is inserted. One end of the part 41 inside the fan casing contacts the electromagnetic noise guard 9. The screw 47 made of a metal is inserted into the part inside the fan casing. Thus, the part 41 inside the fan casing is electrically connected to the electromagnetic noise guard 9 also by the metal screw 47. Further, in the present embodiment, the part 41 inside the fan casing is electrically grounded by some means, not shown. As a result, both the electromagnetic noise guard 9 and electrically-conducting path member 17 are electrically grounded.

Although grounding is done on the electrically-conducting path member 17 in the present embodiment, grounding may be done on the electromagnetic noise guard 9. An end portion 45a of the part 45 inside the motor casing has an annular shape surrounding the bearing holder 3 and contacts the outer periphery of the bearing holder 3. The part 43 inside the web connects the part 41 inside the fan casing and part 45 inside the motor casing. With the above configuration, the electrically-conducting path member 17 connects the electromagnetic noise guard 9 and bearing holder 3 in an electrically conductive manner.

According to the electric fan of the present embodiment, the electromagnetic noise guard 9 and bearing holder 3 with which the outer race 5a of the ball bearing 5 is fitted are connected in an electrically conductive manner by the electrically-conducting path member 17, and the electromagnetic noise guard 9 and electrically-conducting path member are electrically grounded, whereby the outer race 5a of the ball bearing 5 may electrically be grounded. As a result, a potential difference between the outer race 5a and inner race 5b of the ball bearing 5 may be reduced, thereby preventing electric corrosion from occurring in the ball bearing 5. Further, the electromagnetic noise guard 9 and bearing holder 3 exposed outside the electric fan are electrically connected so that the electrical conduction may readily be established between the electromagnetic noise guard 9 and outer race 5a of the ball bearing 5.

Figure 5:
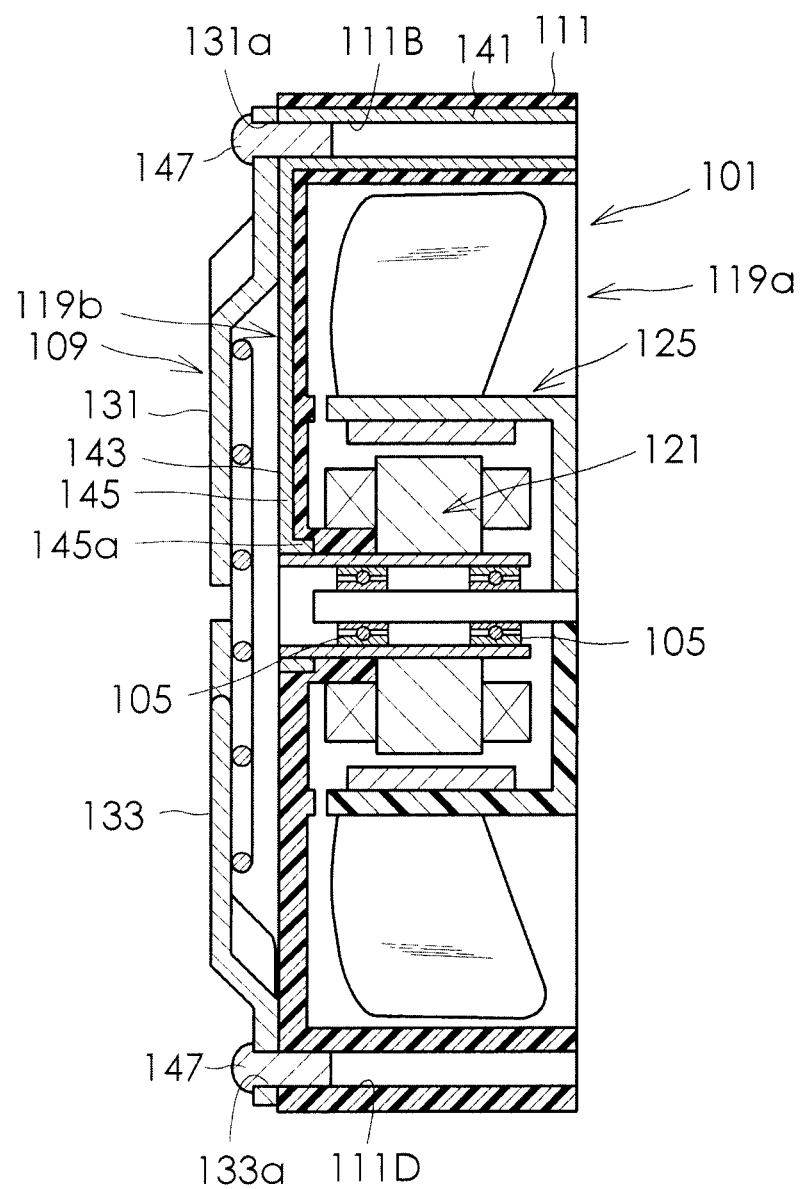
FIG. 5 is a cross-sectional view schematically showing an electric fan according to another embodiment of the present invention.

FIG. 5 is a cross-sectional view schematically showing the electric fan according to another embodiment of the present invention. In the electric fan of the present embodiment, the electromagnetic noise guard 109 is disposed in or over the discharge port 119b of the fan casing 111. Except this aspect, the electric fan of the present embodiment has the same structure as that shown in FIGS. 1 to 4. Thus, reference numerals obtained by adding 100 to the reference numerals in FIGS. 1 to 4 are allocated to the parts which are substantially identical to those of the electric fan shown in FIGS. 1 to 4 and their descriptions are omitted. The two metal supporting plates 131, 133 of the electromagnetic noise guard 109 of the electric fan of the present embodiment are fixed to a side of the discharge port 119b of the fan casing 111 by the screws 147 inserted through the through holes 131a, 133a thereof and into two opposing through holes 111B, 111D in two of four corners of the fan casing 111. The electric fan of the present embodiment is suitably used in a situation where an apparatus that generates electromagnetic noise is located on a side of the discharge port 119b.

Figure 6:
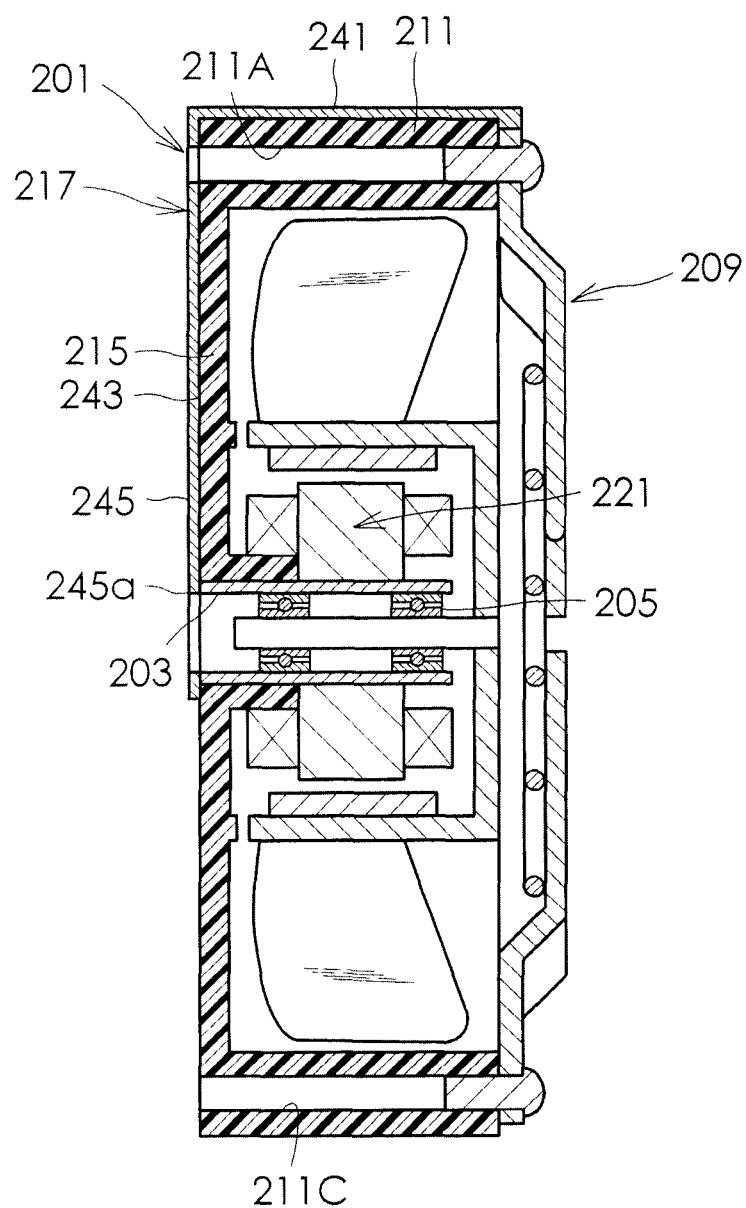
FIG. 6 is a cross-sectional view schematically showing an electric fan according to still another embodiment of the present invention.

FIG. 6 is a cross-sectional view schematically showing the electric fan according to still another embodiment of the present invention. In the electric fan of the present embodiment, the electrically-conducting path member 217 is disposed along the outer surface of the fan housing 201. Except this aspect, the electric fan of the present embodiment has the same structure as that shown in FIGS. 1 to 4. Thus, reference numerals obtained by adding 200 to the reference numerals in FIGS. 1 to 4 are allocated to the parts which are substantially identical to those of the electric fan shown in FIGS. 1 to 4 and their descriptions are omitted. The electrically-conducting path member 217 of the present embodiment integrally include a part (outside the fan casing) 241 disposed along the outer surface of the fan casing 211, a part (outside the web) 243 disposed along the outer surface of one web 215 of the four webs 215, and a part (outside the motor casing) 245 disposed along the outer surface of the motor casing 213. In the present embodiment, the electrically-conducting path member 217 is made of a metal. One end of the part 241 outside the fan casing contacts the electromagnetic noise guard 209 and is electrically grounded by some means, not shown. The end portion 245a of the part 245 outside the motor casing has an annular shape and contacts the end portion of the bearing holder 203. With the above configuration, the electrically-conducting path member 217 connects the electromagnetic noise guard 209 and bearing holder 203 in an electrically conductive manner.

Figure 7:
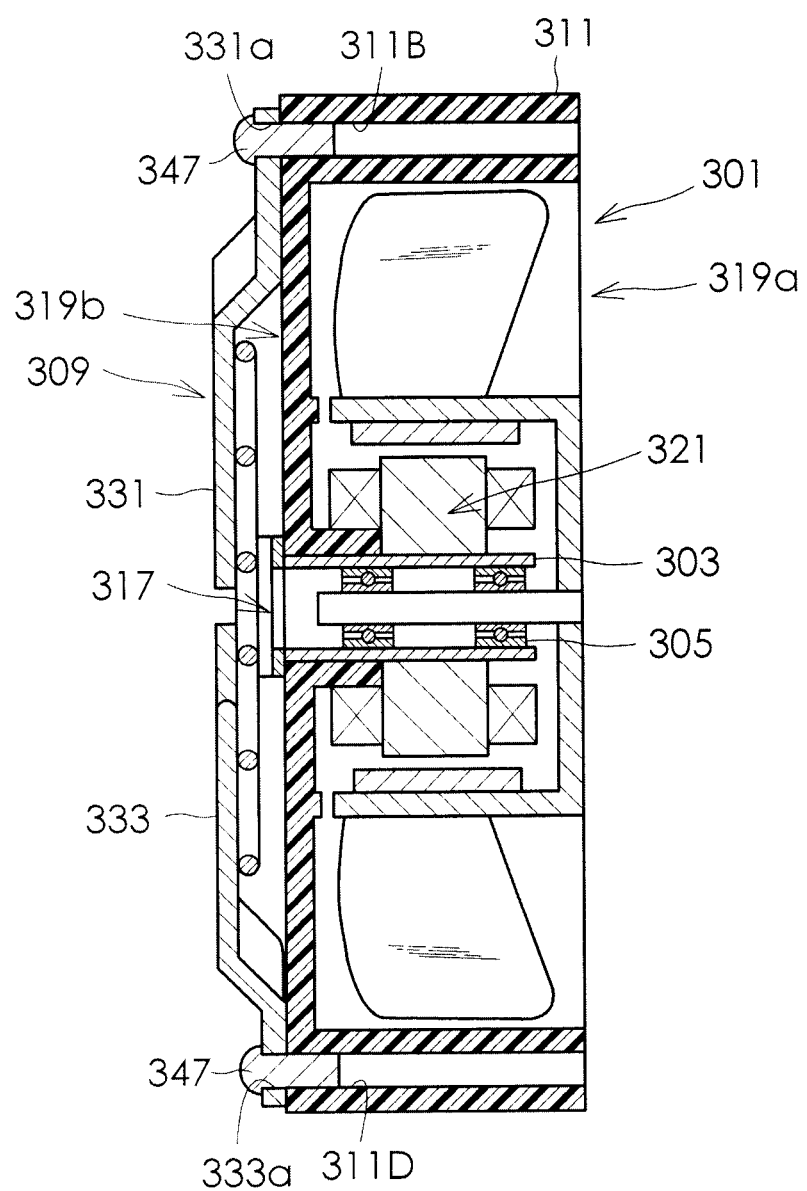
FIG. 7 is a cross-sectional view schematically showing an electric fan according to still another embodiment of the present invention.

FIG. 7 is a cross-sectional view schematically showing the electric fan according to still another embodiment of the present invention. In the electric fan of the present embodiment, the electromagnetic noise guard 309 is disposed in or over the discharge port 319b of the fan casing 311, and electrically-conducting path member 317 is disposed along an outer surface of the fan housing 301. Except this aspect, the electric fan of the present embodiment has the same structure as that shown in FIGS. 1 to 4. Thus, reference numerals obtained by adding 300 to the reference numerals in FIGS. 1 to 4 are allocated to the parts which are substantially identical to those of the electric fan shown in FIGS. 1 to 4 and their descriptions are omitted. Two metal supporting plates 331, 333 of the electromagnetic noise guard 309 of the electric fan of the present embodiment are fixed to a side of the discharge port 319b of the fan casing 311 by the screws 347 inserted through the through holes 331a, 333a thereof and into two opposing through holes 311B, 311D in two of four corners of the fan casing 311. The electrically-conducting path member 317 of the electric fan of the present embodiment connects the metal supporting plate 331 and bearing holder 303 in an electrically conductive manner.

Figure 8:
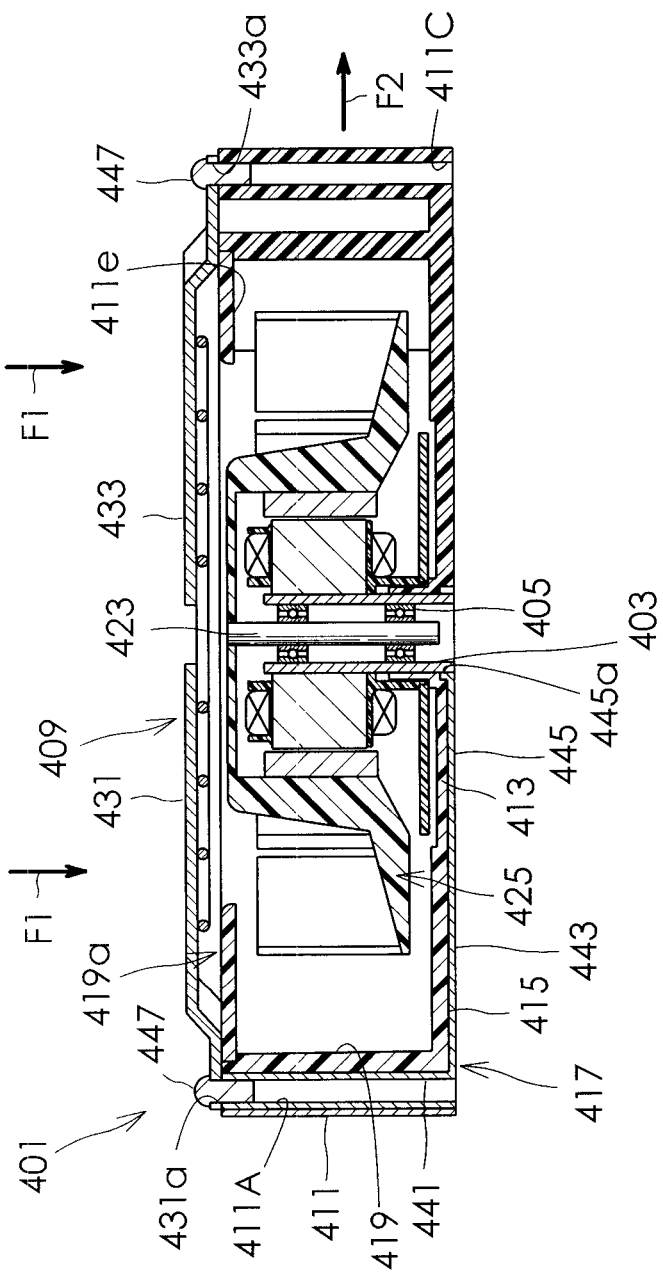
FIG. 8 is a cross-sectional view schematically showing an embodiment in which the electric fan of the present invention is applied to a sirocco fan motor.

FIG. 8 is a cross-sectional view schematically showing an embodiment in which the electric fan of the present invention is applied to a sirocco fan motor. In the electric fan of the present embodiment, the fan housing 401 has a side wall portion 411, a motor casing 413, and a bottom wall portion 415 which are integrally formed of an insulating resin by means of injection molding. A part of the side wall portion 411 is opened to define a discharge port 411e. Therefore, when the impeller 425 rotates in the air channel 419, air flows into the fan housing 401 in the axial direction of the rotary shaft 423 through the suction port 419a (denoted by arrow F1) and flows out in a direction perpendicular to the axial direction of the rotary shaft 423 through the discharge port 411e (denoted by arrow F2). Two metal supporting plates 431, 433 of the electromagnetic noise guard 409 are fixed to a side of the suction port 419a of the side wall portion 411 by the screws 447 inserted through the through holes 431a, 433a thereof and into two opposite through holes 411A, 411C of the side wall portion 411. The electrically-conducting path member 417 integrally includes a part 441 disposed inside the side wall portion 411, a part 443 disposed inside the bottom wall, and a part 445 disposed inside the motor casing 413. The part 441 inside side wall has a cylindrical shape having formed therein the through hole 411A through which the screw 447 for fixing the electromagnetic noise guard 409 is inserted. One end of the part 441 inside side wall contacts the electromagnetic noise guard 409. At this contact point, the screw 447 is inserted into the one end of the part 441 inside side wall. Further, in the present embodiment, the electrically-conducting path member 417 is electrically grounded by some means not shown. As a result, the electromagnetic noise guard 409 is electrically grounded. The end portion 445a of the part 445 inside motor casing has an annular shape surrounding a bearing holder 403 and contacts an outer periphery of the bearing holder 403. The part 443 inside the bottom wall connects the part 441 inside the side wall and part 445 inside the motor casing. With the above configuration, the electrically-conducting path member 417 connects the electromagnetic noise guard 409 and bearing holder 403 in an electrically conductive manner.

Figure 9:
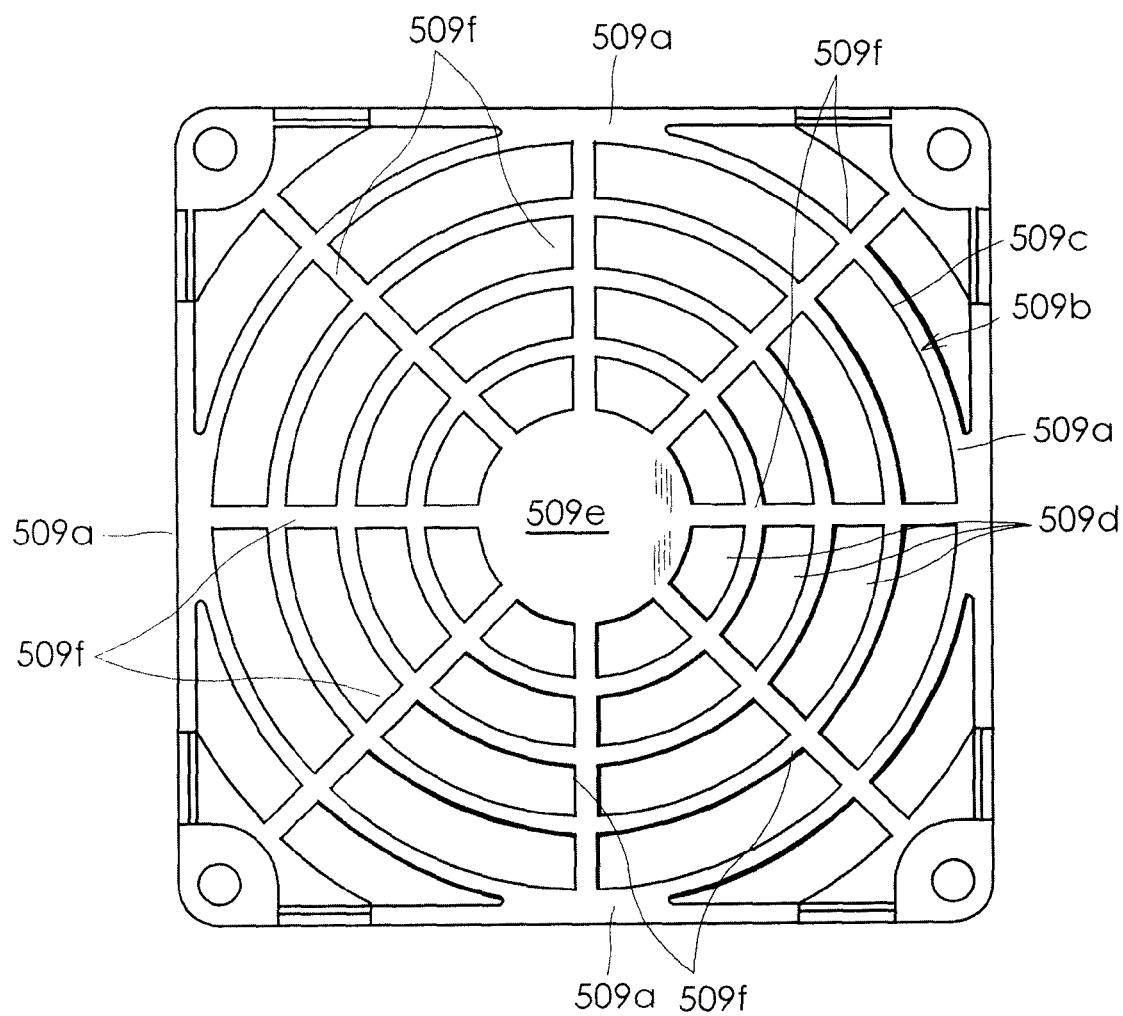
FIG. 9 is a plan view of another example of an electromagnetic noise guard used in the electric fan according to the present invention.

In addition to the above examples, various electromagnetic noise guards may be used. For example, as shown in FIG. 9, an electromagnetic noise guard 509 serving as a finger guard that prevents the user's fingers from entering the motor may be adopted. The electromagnetic noise guard 509 shown in FIG. 9 integrally includes four frame portions 509a and a guard portion 509b. The guard portion 509b is constituted by a radially outermost annular portion 509c connected to the four frame portions 509a, three annular inner portions 509d concentrically arranged inside the radially outermost annular portion 509c, a disk portion 509e positioned at the center of the annular inner portions 509d, and eight linear inner portions 509f radially extending outward from the disk portion 509e so as to connect the frame portions 509a, radially outermost annular portion 509c, and annular inner portions 509d. The radially outermost annular portion 509c is formed such that connection portions between the radially outermost annular portion 509c and frame portions 509a are positioned in the centers of the respective frame portions 509a in a longitudinal direction thereof.

Figure 10:
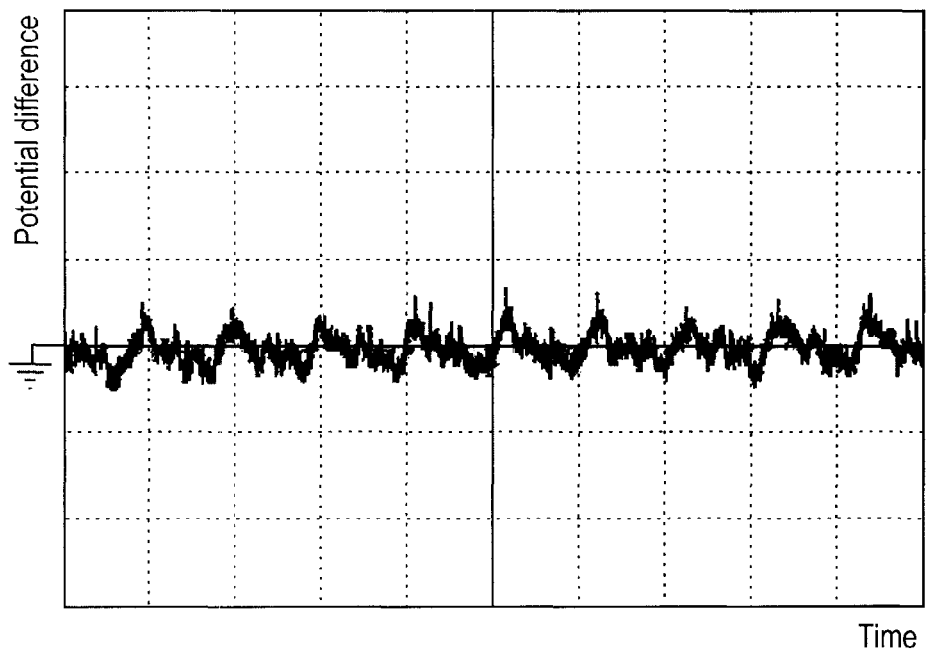
FIG. 10 is a graph showing a relationship between time and a potential difference between the outer and inner races of the ball bearing in the electric fan according to the present invention wherein both the electromagnetic noise guard and electrically-conducting path member are not provided and an apparatus that generates electromagnetic noise is not located in the vicinity of the electric fan.
Figure 11:
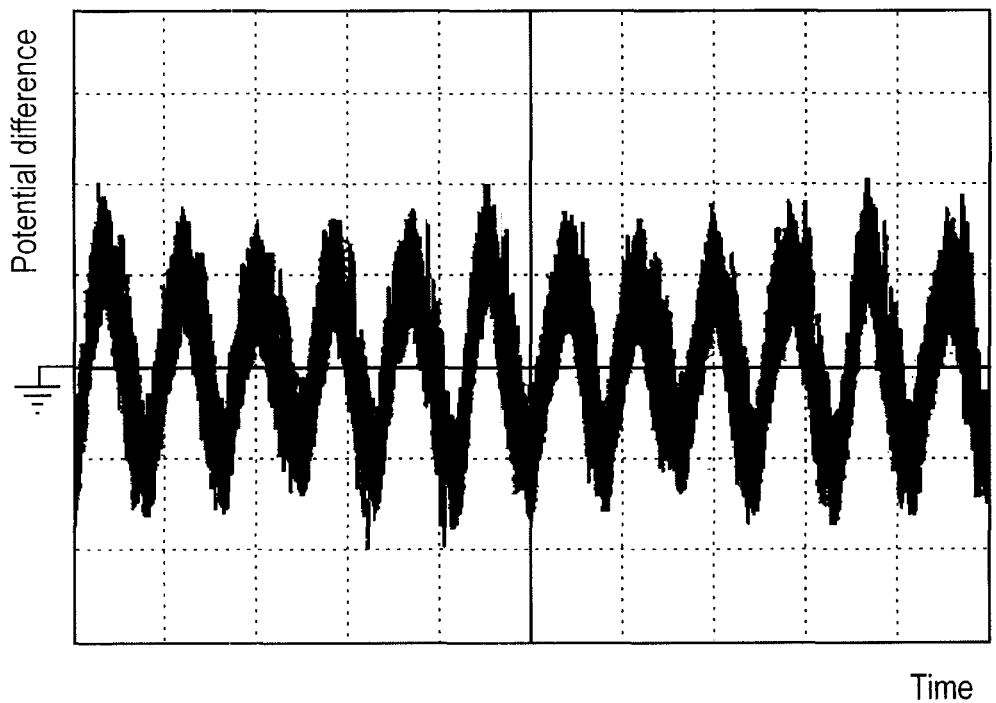
FIG. 11 is a graph showing a relationship between time and a potential difference between the outer and inner races of the ball bearing in the electric fan according to the present invention wherein both the electromagnetic noise guard and electrically-conducting path member are not provided and a rectifier that generates electromagnetic noise is located in the vicinity of the electric fan.
Figure 12:
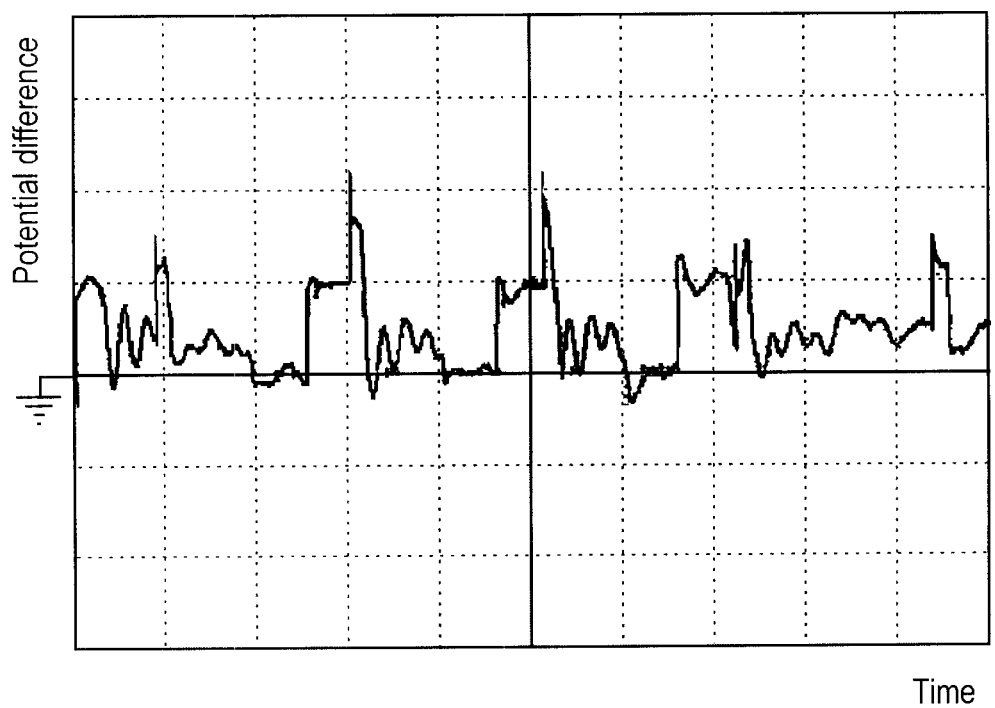
FIG. 12 is an enlarged graph showing a part of the potential difference of FIG. 11.
Figure 13:
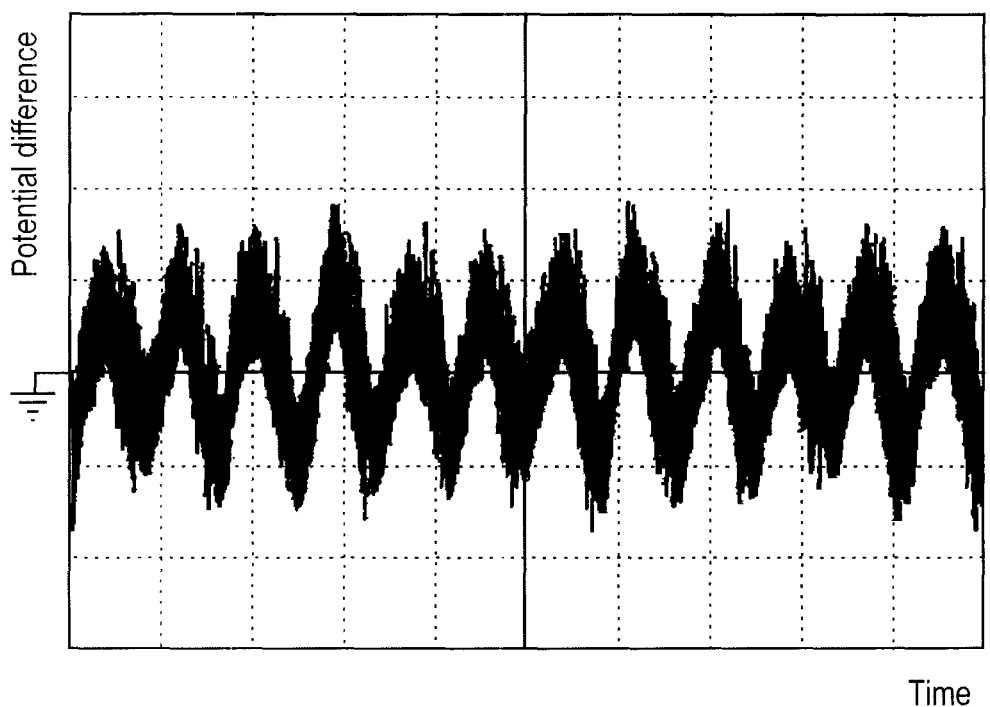
FIG. 13 is a graph showing a relationship between time and a potential difference between the outer and inner races of the ball bearing in the electric fan according to the present invention wherein both the electromagnetic noise guard and electrically-conducting path member are not provided and a rectifier and inverter that generate electromagnetic noise are located in the vicinity of the electric fan.
Figure 14:
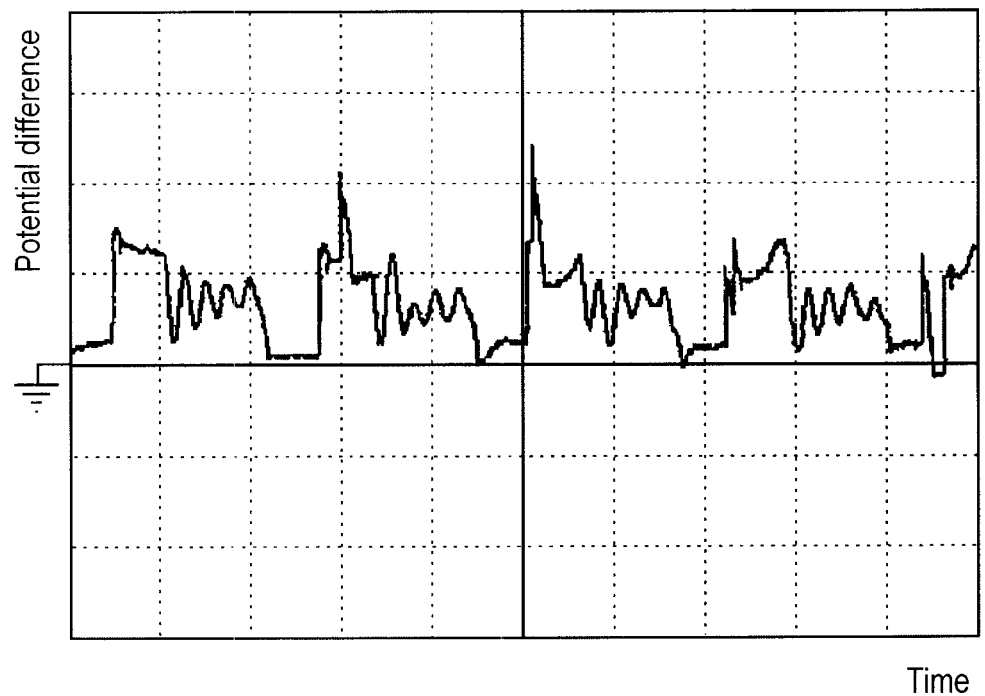
FIG. 14 is an enlarged graph showing a part of the potential difference of FIG. 13.

Experiments for confirming the effect of the electric fan of the present invention were performed. Graphs of FIGS. 10 to 14 each show a relationship between time and a potential difference between the outer and inner races of the ball bearing in an electric fan having the same structure as that shown in FIGS. 1 to 4 but not having the electromagnetic noise guard and electrically-conducting path member. More specifically, FIG. 10 is a graph showing the relationship when an apparatus that generates electromagnetic noise is not located in the vicinity of the electric fan. FIG. 11 is a graph showing the relationship when a rectifier that generates electromagnetic noise is located in the vicinity of the electric fan. FIG. 12 is a graph showing the relationship by partially extending the length of the time axis of FIG. 11. FIG. 13 is a graph showing the relationship when a rectifier and an inverter that generate electromagnetic noise are located in the vicinity of the electric fan. FIG. 14 is a graph showing the relationship by partially enlarging the potential difference of FIG. 13.

Figure 15:
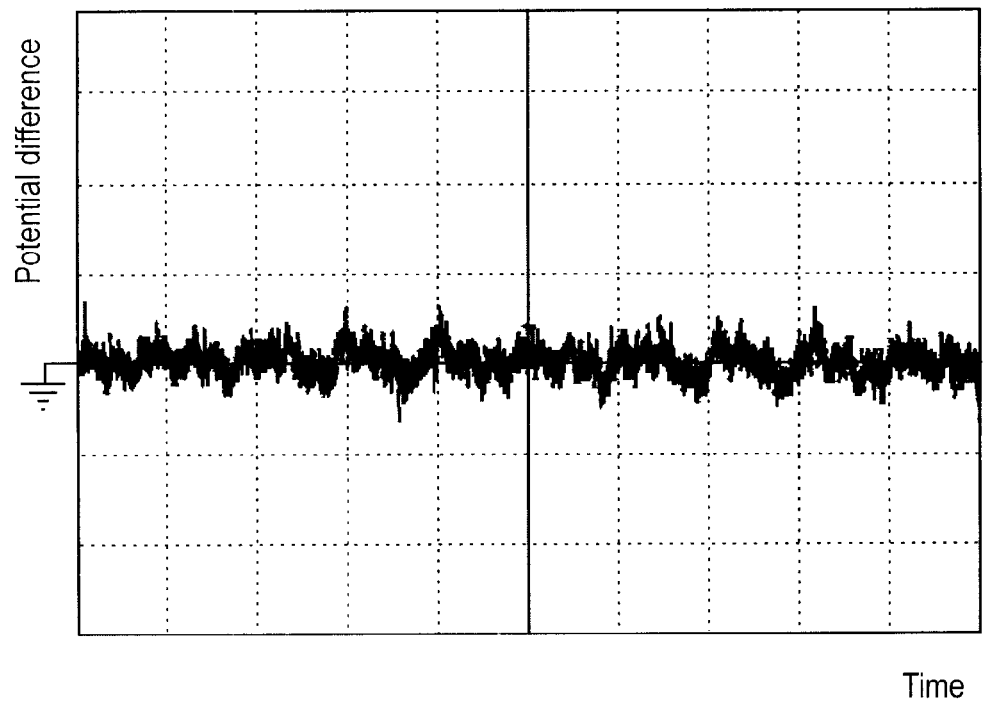
FIG. 15 is a graph showing a relationship between time and a potential difference between the outer and inner races of the ball bearing in the electric fan according to the present invention wherein only the electromagnetic noise guard is provided but the electrically-conducting path member is not provided, and an apparatus that generates electromagnetic noise is located in the vicinity of the electric fan.
Figure 16:
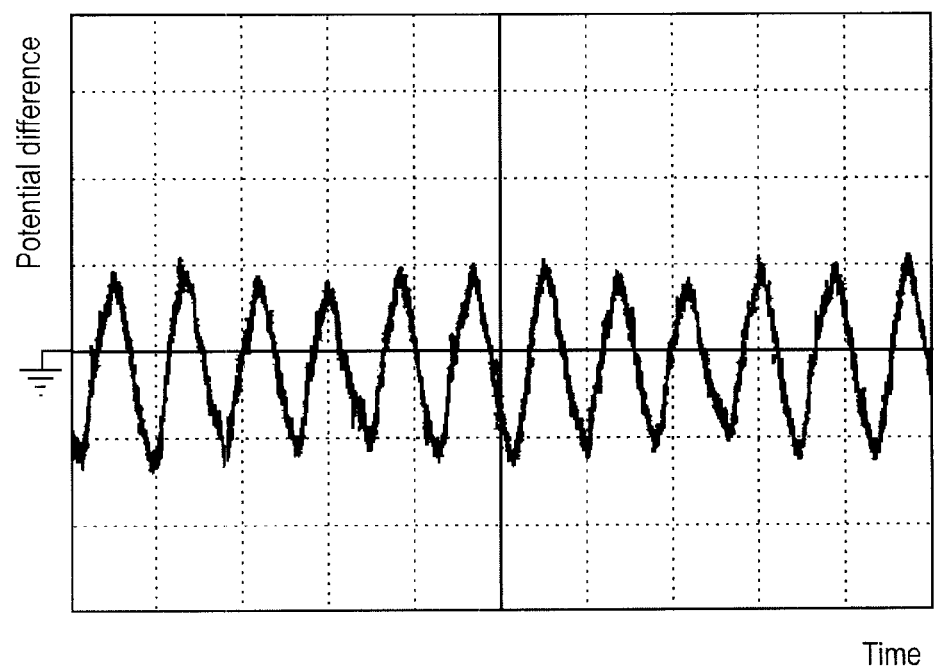
FIG. 16 is a graph showing a relationship between time and a potential difference between the outer and inner races of the ball bearing in the electric fan according to the present invention wherein only the electromagnetic noise guard is provided but the electrically-conducting path member is not provided, and a rectifier that generates electromagnetic noise is located in the vicinity of the electromagnetic noise guard of the electric fan.
Figure 17:
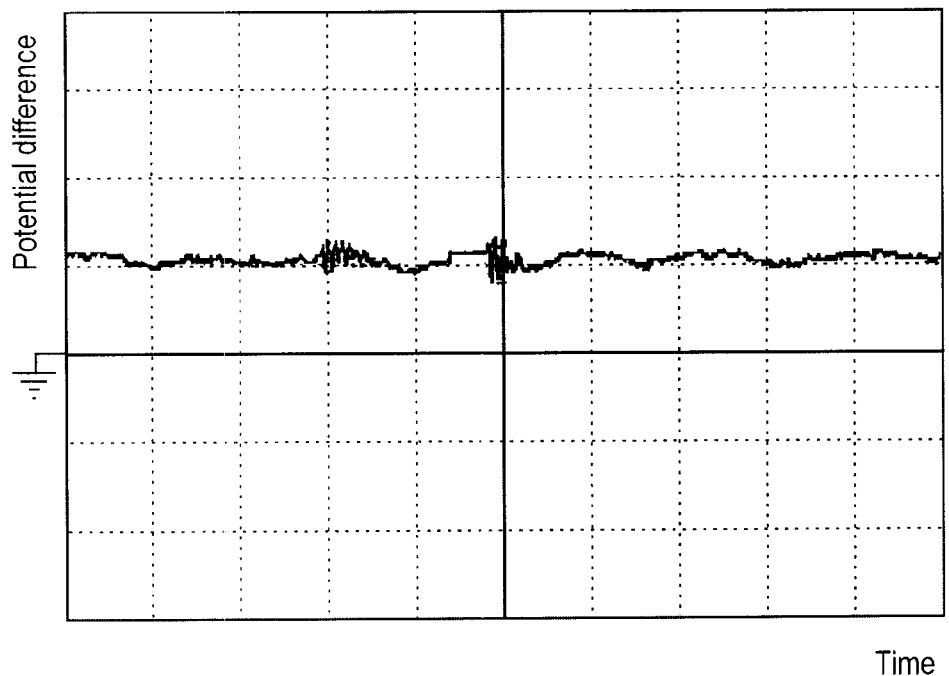
FIG. 17 is an enlarged graph showing a part of the potential difference of FIG. 16.
Figure 18:
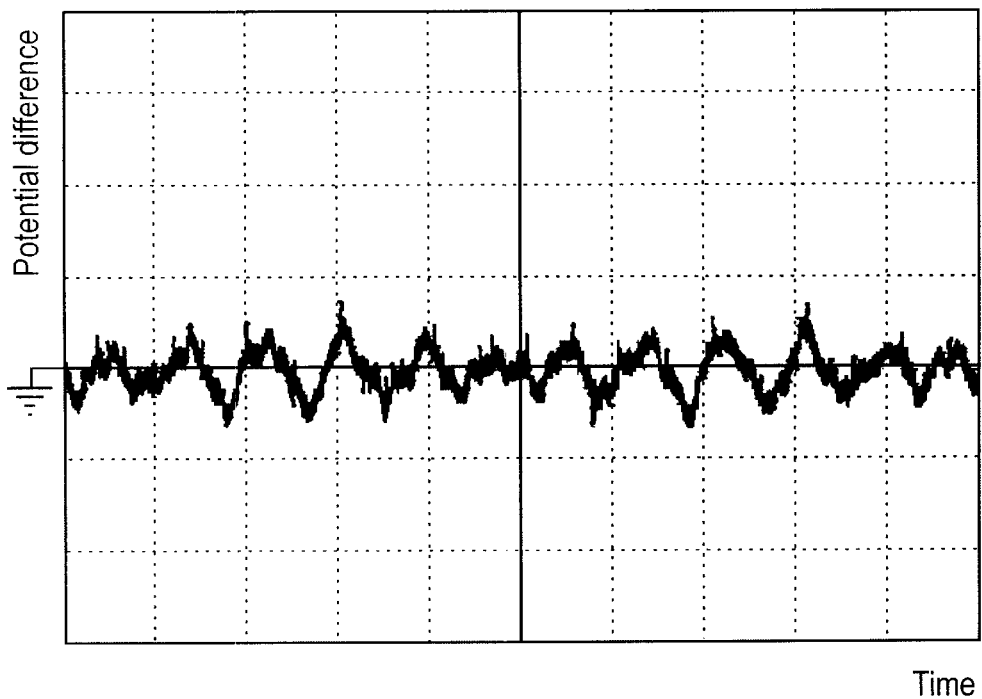
FIG. 18 is a graph showing a relationship between time and a potential difference between the outer and inner races of the ball bearing in the electric fan according to the present invention wherein only the noise guard is provided but the electrically-conducting path member is not provided, and a rectifier and inverter that generate electromagnetic noise are located in the vicinity of the electromagnetic noise guard of the electric fan.
Figure 19:
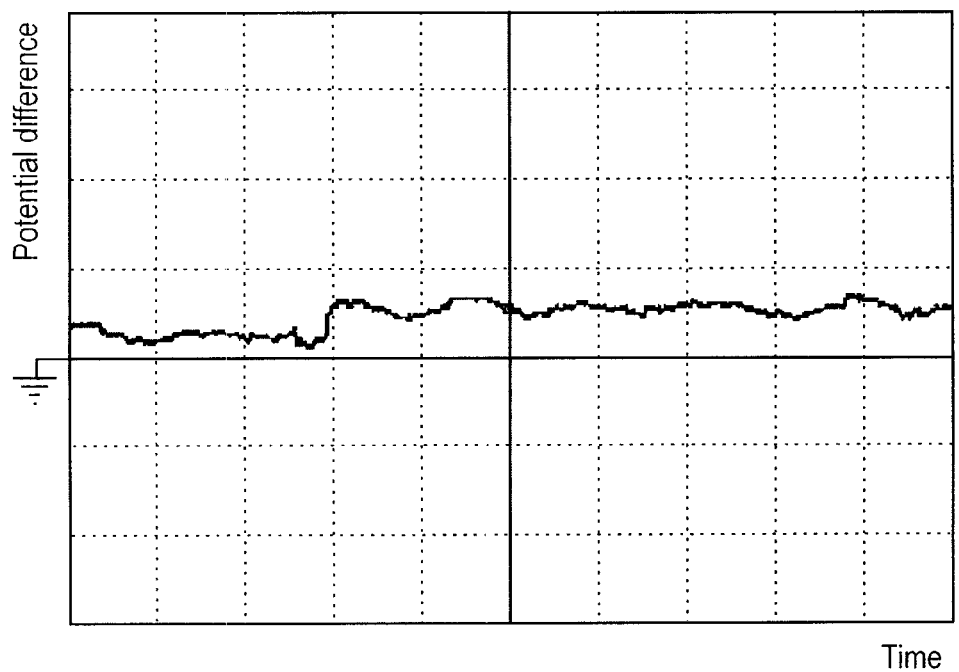
FIG. 19 is an enlarged graph showing a part of the potential difference of FIG. 18.

Graphs of FIGS. 15 to 19 each show a relationship between time and a potential difference between the outer and inner races of the ball bearing in an electric fan having the same structure as that shown in FIGS. 1 to 4, wherein only the electromagnetic noise guard is provided while the electrically-conducting path member is not provided. More specifically, FIG. 15 is a graph showing the relationship when an apparatus that generates electromagnetic noise is not located in the vicinity of the electric fan. FIG. 16 is a graph showing the relationship when a rectifier that generates electromagnetic noise is located in the vicinity of the electromagnetic noise guard of the electric fan. FIG. 17 is a graph showing the relationship by partially enlarging the potential difference of FIG. 16. FIG. 18 is a graph showing the relationship when a rectifier and an inverter that generate electromagnetic noise are located in the vicinity of the electromagnetic noise guard of the electric fan. FIG. 19 is a graph showing the relationship by partially enlarging the potential difference of FIG. 18.

Figure 20:
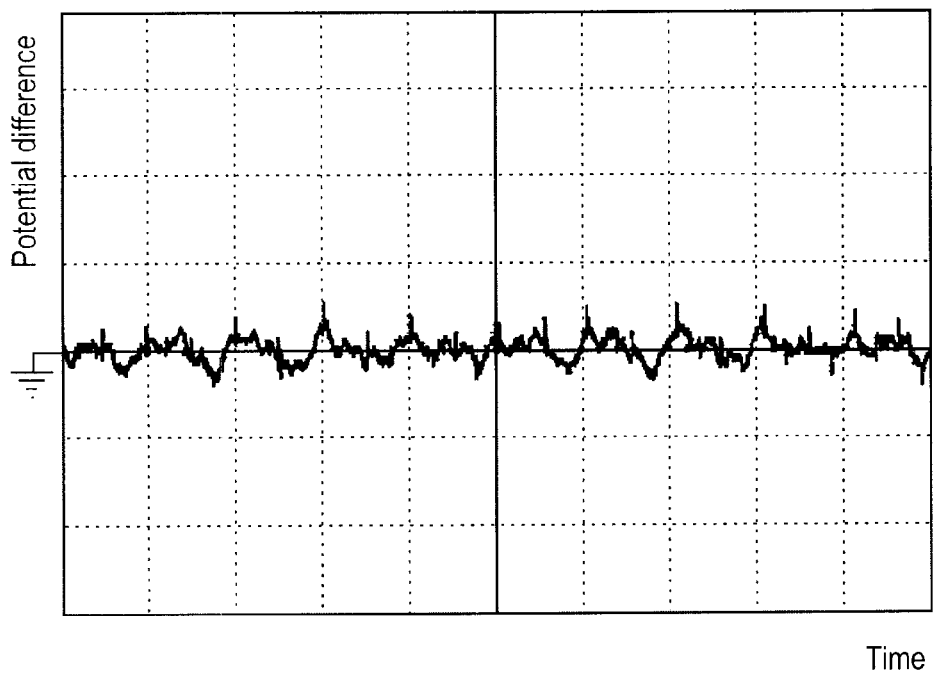
FIG. 20 is a graph showing a relationship between time and a potential difference between the outer and inner races of the ball bearing in the electric fan according to the present invention wherein both the electromagnetic noise guard and electrically-conducting path member are provided and in the case where an apparatus that generates electromagnetic noise is not located in the vicinity of the electric fan.
Figure 21:
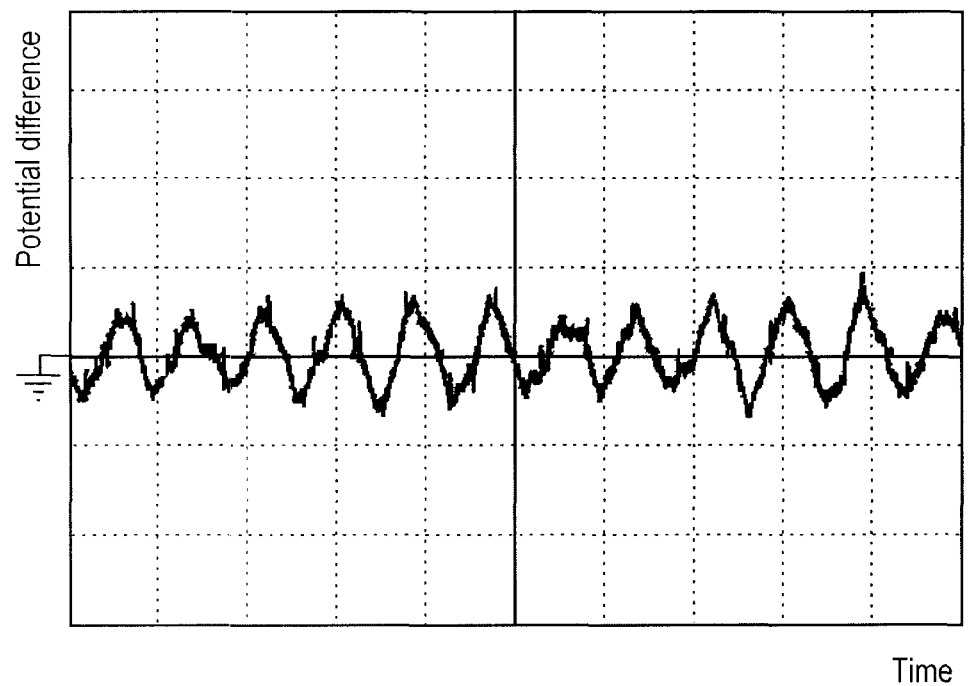
FIG. 21 is a graph showing a relationship between time and a potential difference between the outer and inner races of the ball bearing in the electric fan according to the present invention wherein both the electromagnetic noise guard and electrically-conducting path member are provided and a rectifier and inverter that generate electromagnetic noise are located in the vicinity of the electromagnetic noise guard of the electric fan.
Figure 22:
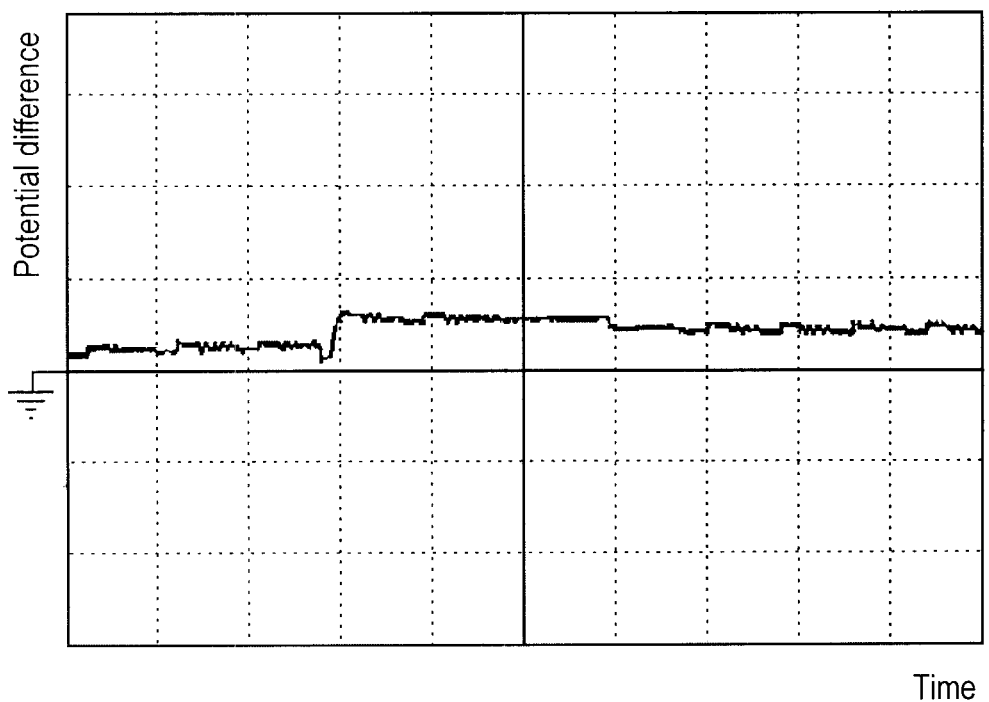
FIG. 22 is an enlarged graph showing a part of the potential difference of FIG. 21.
Figure 23:
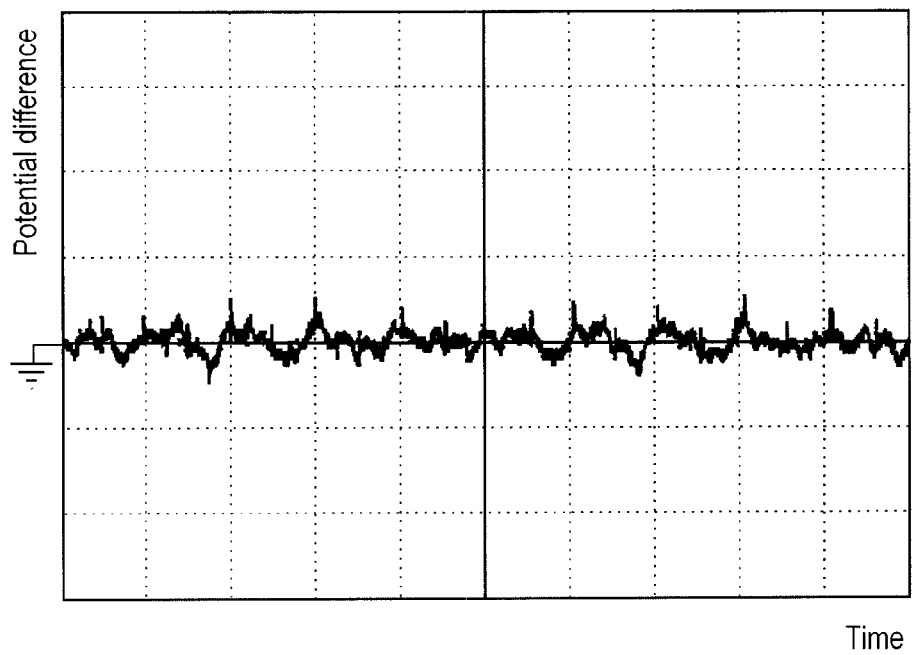
FIG. 23 is a graph showing a relationship between time and a potential difference between the outer and inner races of the ball bearing in the electric fan according to the present invention wherein both the electromagnetic noise guard and electrically-conducting path member are provided and a rectifier and inverter that generate electromagnetic noise are located in the vicinity of the electromagnetic noise guard of the electric fan.
Figure 24:
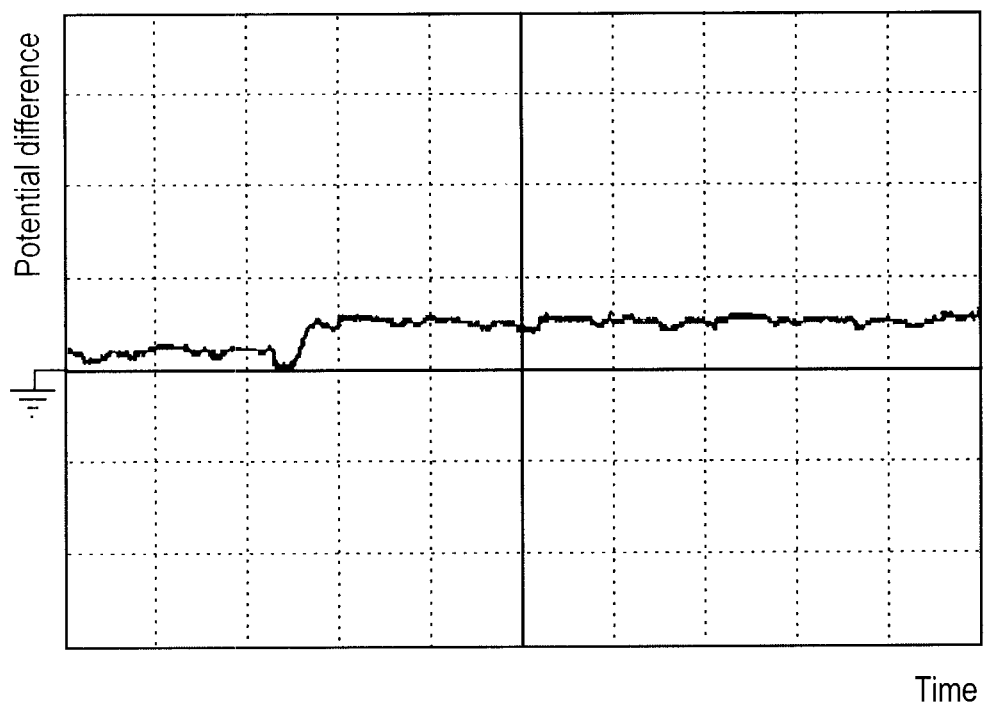
FIG. 24 is an enlarged graph showing a part of the potential difference of FIG. 23.

Graphs of FIGS. 20 to 24 each show a relationship between time and a potential difference between the outer and inner races of the ball bearing in an electric fan having the same structure as that shown in FIGS. 1 to 4, wherein the electromagnetic noise guard and electrically-conducting path member are provided. More specifically, FIG. 20 is a graph showing the relationship when an apparatus that generates electromagnetic noise is not located in the vicinity of the electric fan. FIG. 21 is a graph showing the relationship when a rectifier that generates electromagnetic noise is located in the vicinity of the electromagnetic noise guard of the electric fan. FIG. 22 is a graph showing the relationship by partially enlarging the potential difference of FIG. 21. FIG. 23 is a graph showing the relationship when a rectifier and an inverter that generate electromagnetic noise are located in the vicinity of the electromagnetic noise guard of the electric fan. FIG. 24 is a graph showing the relationship by partially enlarging the potential difference of FIG. 23.

It can be understood from FIGS. 10, 15, and 20 that when an apparatus that generates electromagnetic noise is not located in the vicinity of the electric fan, a potential difference between the outer and inner races is not so large. However, the results of FIGS. 16 and 21 reveal that in a situation where a rectifier that generates electromagnetic noise is located in the vicinity of the electromagnetic noise guard of the electric fan, the potential difference between the outer and inner races may reduced more (FIG. 21) when both the electromagnetic noise guard and electrically-conducting path member are provided in the electric fan than when only the electromagnetic noise guard is provided in the electric fan (FIG. 16). Further, the results of FIGS. 18, 19, 23, and 24 reveal that even though a rectifier and an inverter that generate electromagnetic noise are located in the vicinity of the electromagnetic noise guard of the electric fan, the potential difference between the outer and inner races in the electric fan (FIGS. 23 and 24) may be reduced more when the electromagnetic noise guard and electrically-conducting path member are provided than when only the electromagnetic noise guard is provided in the electric fan (FIGS. 18 and 19).

Although an electromagnetic noise guard including two metal supporting plates and plurality of closed loop conductors or a finger guard is used in the above embodiments, other various types of electromagnetic noise guards for example, an electromagnetic noise guard including a single metal supporting plate may be used.

According to the present invention, the electrically grounded electromagnetic noise guard and the bearing holder in which the outer race of the ball bearing is fitted or the outer race of the ball bearing are electrically connected so that the outer race of the ball bearing may electrically be grounded. As a result, the potential difference between the outer and inner races of the ball bearing may be reduced, thereby preventing electrical corrosion from occurring in the ball bearing.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An electric fan comprising:
    a fan housing made of an insulating resin and including an air channel having a suction port and a discharge port;
    a bearing holder fixed to the fan housing;
    at least one ball bearing that is made of a metal and is held by the bearing holder;
    a motor including a stator and a rotary shaft made of a metal and supported by the at least one ball bearing;
    an impeller fixed on the rotary shaft to rotate in the air channel; and
    an electromagnetic noise guard made of a metal and disposed over the suction port or the discharge port of the air channel and electrically grounded, wherein
    the bearing holder is made of a metal; and,
    the electromagnetic noise guard and the outer race of the at least one ball bearing are electrically connected by an electrically connecting means including an electrically-conducting path member that is insert molded into fan housing and connected to the bearing holder and the electromagnetic noise guard so as to be capable of electrical conduction.

2. The electric fan according to claim 1, wherein
    the fan housing comprises a fan casing including the air channel, a motor casing which is provided with the bearing holder and to which the stator of the motor is fixed, and a plurality of webs connecting the fan casing and the motor casing; and
        the fan casing, the webs, and the motor casing are integrally formed of the insulating resin by means of injection molding to configure the fan housing.

3. The electric fan according to claim 1, wherein
    the outer race of the at least one ball bearing is fitted in the bearing holder, an inner race of the at least one ball bearing is fitted with the rotary shaft of the motor, and a plurality of rolling elements are disposed between the inner race and the outer race via a lubricant.

4. The electric fan according to claim 1, wherein
    the bearing holder is made of a metal; and
    the electromagnetic noise guard and the outer race of the at least one ball bearing are electrically connected by an electrically connecting means including an electrically-conducting path member that is disposed along an outer surface of the fan housing and connected to the bearing holder and the electromagnetic noise guard so as to be capable of electrical conduction.

5. The electric fan according to claim 1, wherein
    the electromagnetic noise guard includes at least one closed loop conductor made of a metal and opposed to the suction port or the discharge port; and
    a conductor holding means for holding the closed loop conductor.

6. The electric fan according to claim 2, wherein
    the electromagnetic noise guard includes at least one closed loop conductor made of a metal and opposed to the suction port or the discharge port; and
    a conductor holding means for holding the closed loop conductor.

7. The electric fan according to claim 3, wherein
    the electromagnetic noise guard includes at least one closed loop conductor made of a metal and opposed to the suction port or the discharge port; and
    a conductor holding means for holding the closed loop conductor.

8. The electric fan according to claim 4, wherein
    the electromagnetic noise guard includes at least one closed loop conductor made of a metal and opposed to the suction port or the discharge port; and
    a conductor holding means for holding the closed loop conductor.

* * * * *